(12) United States Patent
Urfig

(10) Patent No.: US 7,127,910 B2
(45) Date of Patent: Oct. 31, 2006

(54) AIR COOLING DEVICE

(75) Inventor: Bernard Elan Urfig, North Vancouver (CA)

(73) Assignee: Misterchill, LLC, Los Angeles, CA (US)

( * ) Notice: Subject to any disclaimer, the term of this patent is extended or adjusted under 35 U.S.C. 154(b) by 84 days.

(21) Appl. No.: 11/009,922

(22) Filed: Dec. 10, 2004

(65) Prior Publication Data

US 2006/0123832 A1 Jun. 15, 2006

(51) Int. Cl.
F25D 3/02 (2006.01)
(52) U.S. Cl. .............................. 62/422; 62/424; 62/425; 62/529
(58) Field of Classification Search .......... 62/420–425, 62/529–530; 126/400; 165/10
See application file for complete search history.

(56) References Cited

U.S. PATENT DOCUMENTS

| 1,922,790 | A | 8/1933 | Alger | 62/133 |
| D93,401 | S | 9/1934 | Jepertinger | |
| D157,840 | S | 3/1950 | Carraway | D62/4 |
| 2,802,347 | A * | 8/1957 | Marcus | 62/244 |
| 3,774,410 | A | 11/1973 | Hans | 62/406 |
| 4,879,880 | A * | 11/1989 | Harrison | 62/406 |
| 5,046,329 | A | 9/1991 | Travis, III | 62/259.3 |
| 5,159,819 | A | 11/1992 | Wong | 62/419 |
| 5,314,005 | A | 5/1994 | Dobry | 165/10 |
| 5,359,864 | A * | 11/1994 | Yamada | 62/480 |
| 5,860,293 | A | 1/1999 | Piro | 62/420 |
| 5,953,933 | A | 9/1999 | Cheng | 62/425 |
| 6,192,702 | B1 | 2/2001 | Shimogori | 62/259.3 |
| 6,269,651 | B1 * | 8/2001 | Price | 62/255 |
| 6,357,251 | B1 * | 3/2002 | Marks | 62/425 |
| 2004/0011073 | A1 | 1/2004 | Blackstone | 62/420 |

* cited by examiner

Primary Examiner—William E. Tapolcai
(74) Attorney, Agent, or Firm—Cislo & Thomas, LLP

(57) ABSTRACT

An air cooling device includes a thermally insulated container being packed with encapsulated refrigerant and adapted to pass incoming air for cooling. The air cooling device has a housing adapted to accommodate the thermally insulated container and force the incoming air to flow inside the refrigerant-packed container against gravity to ensure a prolonged air cooling period. The encapsulated refrigerant is configured as a plurality of compacted frozen glycol balls serving as primary source of cooling for the incoming air. Air pockets are formed between the frozen glycol balls that serve as secondary source of cooling for the incoming air.

20 Claims, 6 Drawing Sheets

AIR COOLING DEVICE

BACKGROUND

Human beings normally function over a fairly narrow ambient temperature range. Adjustment of the amount and type of clothing may afford some relief from rising or falling ambient air temperature. However, as ambient air temperature steadily rises, conditioning the same by some form of heat extraction is a preferred solution to maintaining comfortable body temperature. Typically, such heat extraction is performed by air conditioners.

Air conditioners operate on the principle of heat absorption whereby a refrigerant substance may gradually change phase from solid to liquid or from liquid to gas. Unfortunately, most of the known air conditioners are fairly bulky and costly to maintain. Various types of portable or semi-portable air cooling devices have been developed over the years. Most such air cooling devices are designed to cool an enclosed space, for example, rooms of a building, the interior of a motor vehicle, and the like. These air cooling devices must, therefore, be capable of efficiently cooling a relatively large volume of air. Unfortunately, known devices of this type require relatively costly and/or bulky power sources.

Some known air cooling devices utilize indirect conduction of heat between water and air with the cooling effect of air being relatively low. This increases the size and weight of the air cooling device and requires a bigger space for storage and/or installation. Other air cooling devices use a multi-tube type heat exchanger which requires a large quantity of cooling water to flow in a single pass or in a constantly circulating manner. Additionally, the maintenance of the heat exchanger is somewhat troublesome because of the necessity of cleaning the complicated cooling water tubes. Portable air conditioners or swamp cooler systems are designed for spot cooling, not area cooling, and are thus relatively ineffective.

SUMMARY

Exemplary embodiments disclosed herein are generally directed to an air cooling device.

In accordance with one aspect of the invention, the air cooling device comprises at least one thermally insulated container being packed with encapsulated refrigerant and adapted to pass incoming air for cooling. The air cooling device also comprises a housing adapted to accommodate the thermally insulated container and force the incoming air to flow inside the refrigerant-packed container against gravity to ensure a prolonged air cooling period.

This and other aspects of the invention will become apparent from a review of the accompanying drawings and the following detailed description of the invention.

BRIEF DESCRIPTION OF THE DRAWINGS

The invention is generally shown by way of reference to the accompanying drawings in which.

DETAILED DESCRIPTION

The detailed description set forth below in connection with the appended drawings is intended as a description of exemplary embodiments and is not intended to represent the only forms in which the exemplary embodiments may be constructed and/or utilized. The description sets forth the functions and the sequence of steps for constructing and operating the exemplary embodiments in connection with the illustrated embodiments. However, it is to be understood that the same or equivalent functions and sequences may be accomplished by different embodiments that are also intended to be encompassed within the spirit and scope of the invention.

Some embodiments of the invention will be described in detail with reference to the related drawings of FIGS. 1–8. Additional embodiments, features and/or advantages of the invention will become apparent from the ensuing description or may be learned by practicing the invention. In the figures, the drawings are not to scale with like numerals referring to like features throughout both the drawings and the description.

Figure 1:
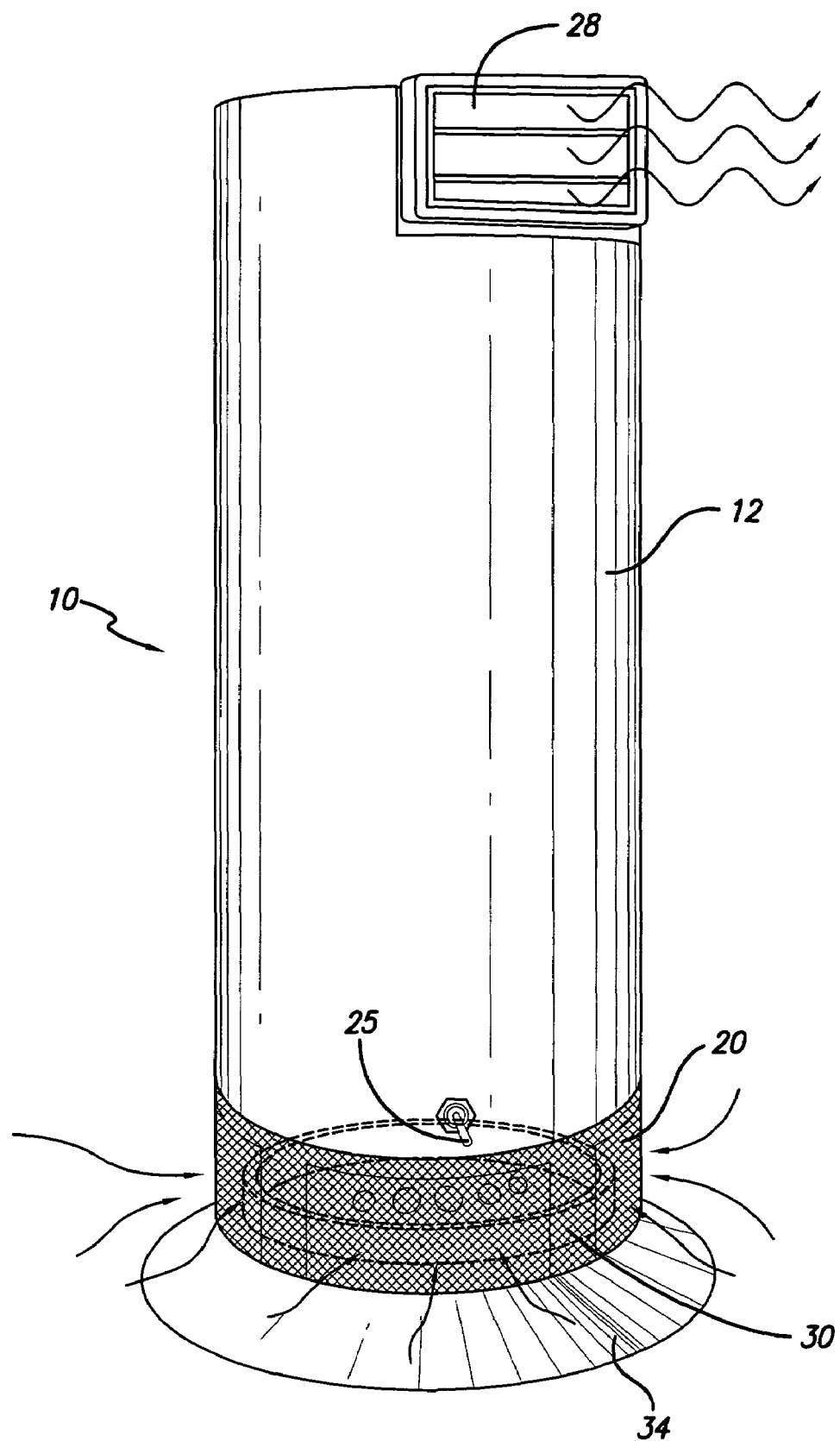
FIG. 1 is a front perspective view of an air cooling device in accordance with an exemplary embodiment of the present invention.
Figure 2:
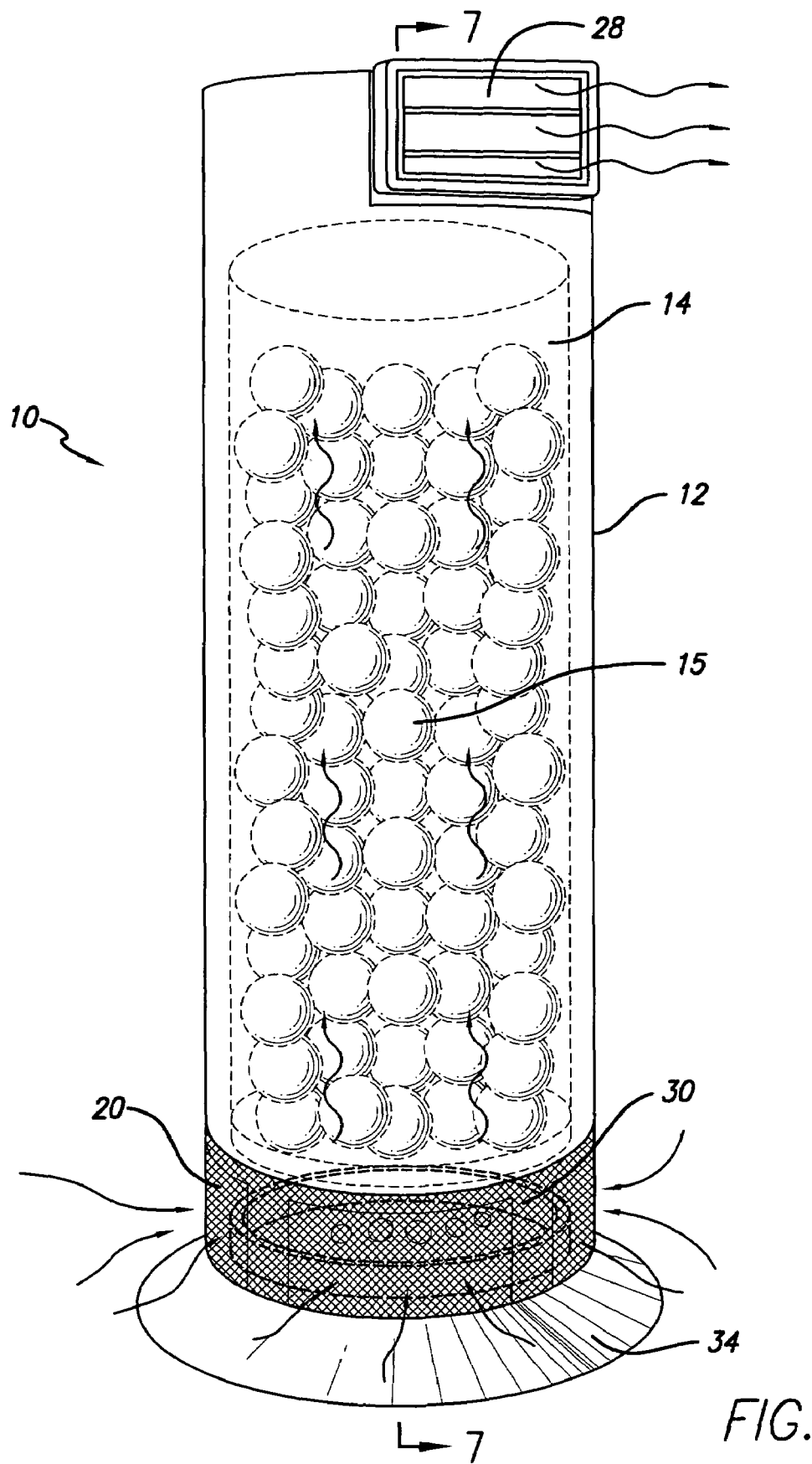
FIG. 2 is an internal perspective view of the air cooling device of FIG. 1.
Figure 3:
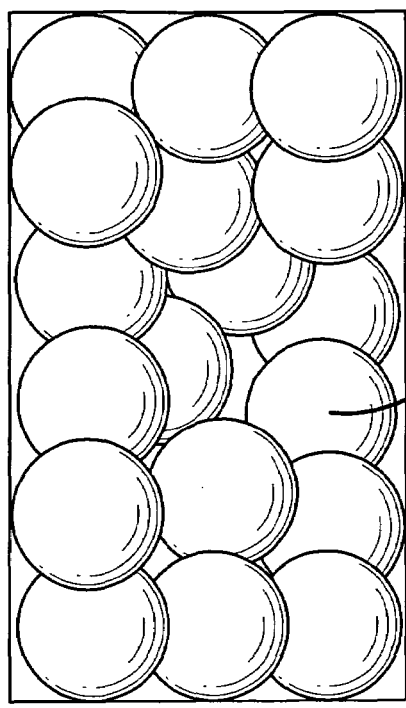
FIG. 3 is a partial perspective view of another exemplary embodiment of the present invention.
Figure 4:
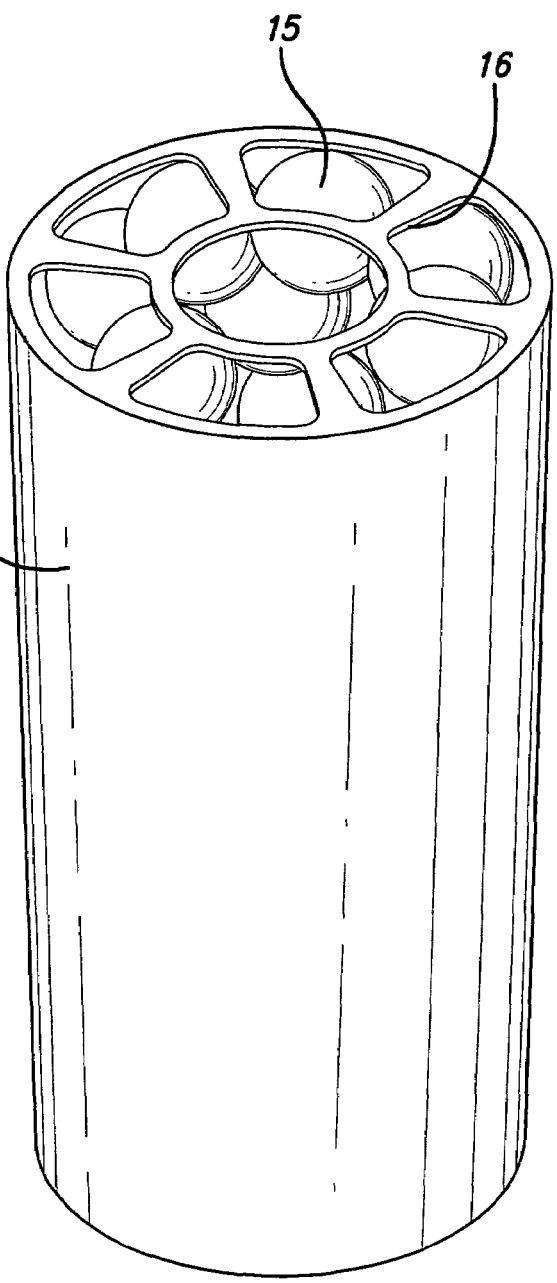
FIG. 4 is a perspective view of yet another exemplary embodiment of the present invention.

FIG. 1 is a front perspective view of an air cooling device 10 in accordance with an exemplary embodiment of the present invention. Air cooling device 10 comprises a generally tubular housing 12 (FIG. 1) adapted to accommodate a thermally insulated container 14 containing encapsulated refrigerant 15, as generally shown in FIG. 2. Encapsulated refrigerant 15 is configured as a plurality of compacted frozen balls/bubbles (FIG. 3). Each ball/bubble is filled with a cooling agent that is capable of freezing and sustaining its frozen state for periods longer than water once exposed to the atmosphere. Cooling agents of this type may include ethylene glycol and its polymers, propylene glycol and its polymers, glycerol and its polymers and/or the like.

The cooling agent may be injected in the balls/bubbles before freezing. Alternatively, the cooling agent may be automatically encapsulated at a manufacturing facility. For example, glycol balls may be trapped between two relatively thin, flexible sheets of plastic. The plastic sheets may be heat-sealed together to securely and compactly trap the glycol balls between the sheets. The trapped glycol balls may be mass-produced in encapsulated sheet form and cut to size, as needed. A household or commercial freezer may be used to freeze the encapsulated glycol balls. One or more frozen glycol sheets may be inserted in thermally insulated container 14, as needed. Unused glycol sheets are easily stored away for later use.

Container 14 may be made from plastic, foam or other suitable thermally insulating material. Container 14 has a partially open top 16 (FIG. 4) and a partially open bottom 18 (FIG. 6) adapted to allow air to flow there through. Partially open top 16 and/or partially open bottom 18 may be removed to allow the insertion of encapsulated refrigerant 15. With encapsulated refrigerant 15 packed inside (FIG. 2), container 14 is introduced into the hollow interior of housing 12, as generally depicted by directional arrow 17 in FIG. 5.

Figures 5, 6:
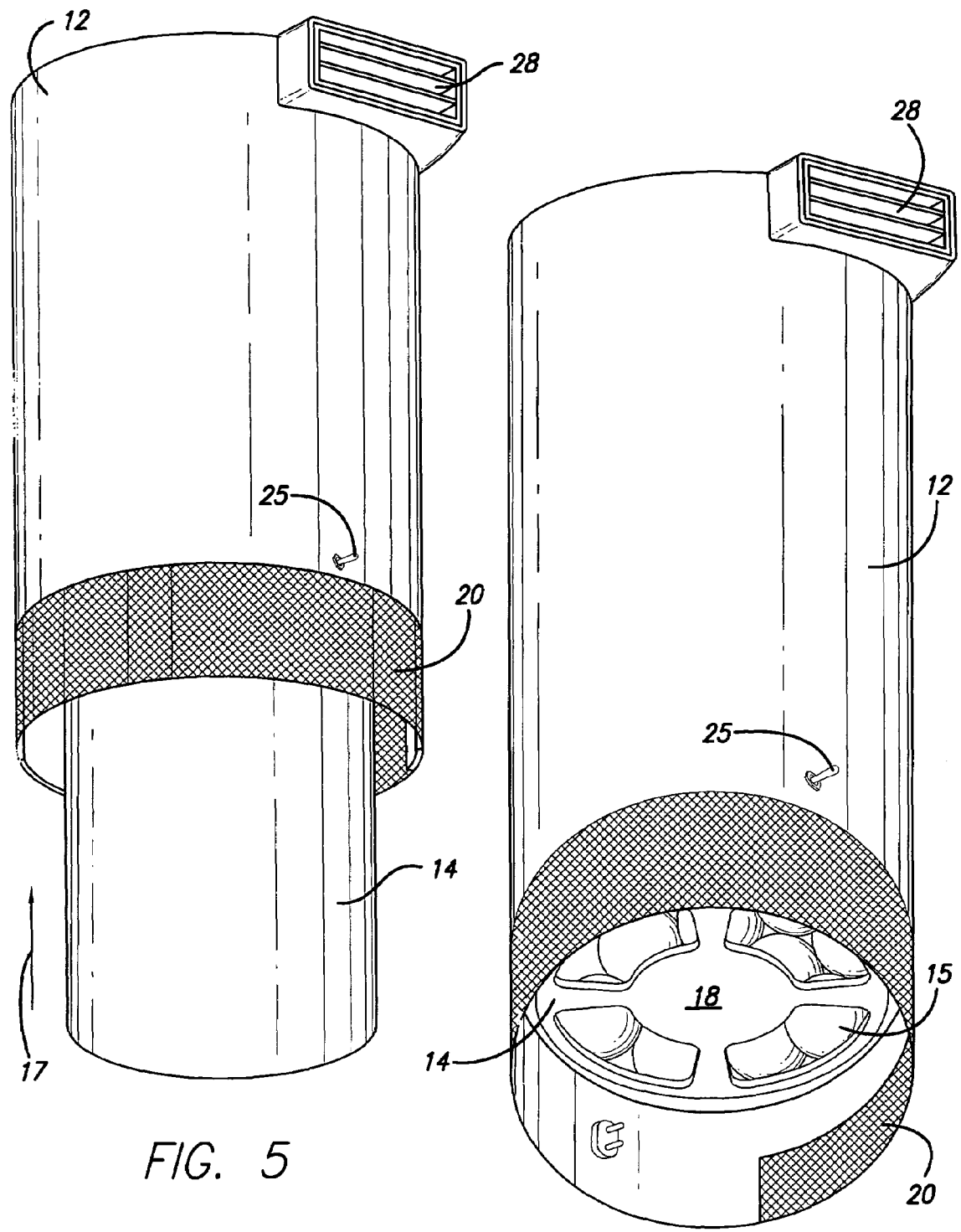
FIG. 5 is a perspective view of still another exemplary embodiment of the present invention.
FIG. 6 is a perspective view of a different exemplary embodiment of the present invention.
Figure 7:
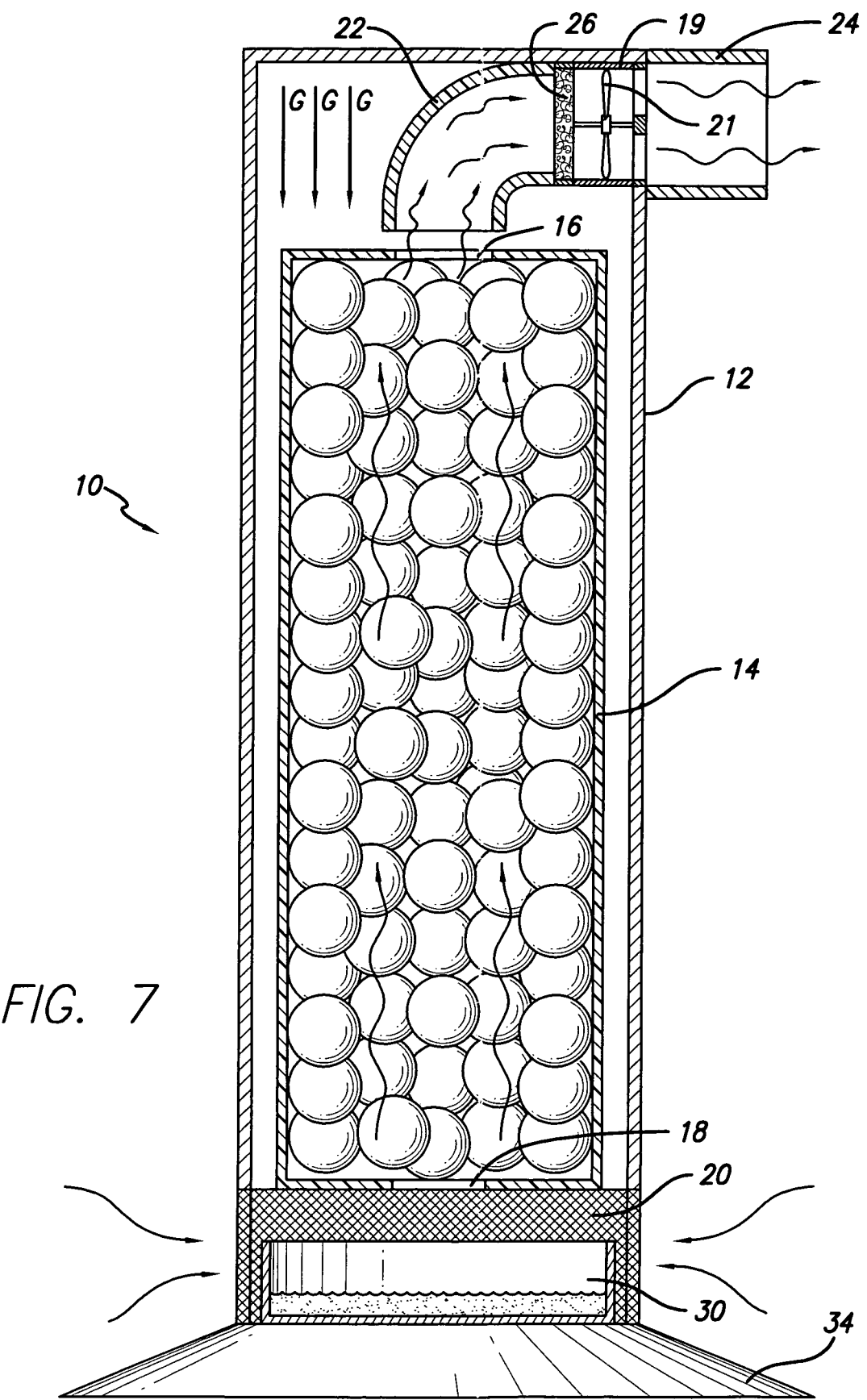
FIG. 7 is a cross-sectional view along section line 7—7 of FIG. 2.

Housing 12 is equipped at one end with a blower 19 and at an opposite end with a mesh-like air intake portion 20, as generally illustrated in FIGS. 1–2, 5–8. Ambient air is pulled inside refrigerant-packed container 14 for cooling by blower 19 (FIG. 7) via air intake portion 20 and partially open bottom 18. Blower 19 has fan blade(s) 21 being driven by an integral motor (not shown), an air inlet section 22 and an air outlet section 24 (FIG. 7). Air inlet section 22 is in communication with cold air coming from the interior of container 14 through partially open top 16. Air inlet section 22 may be equipped with an air filter 26 (FIG. 7). The blower motor is turned on by a switch 25 operatively mounted on the exterior of housing 12 (FIGS. 1, 5–6). Once turned on, blower 19 evacuates cold air from the interior of container 14 via air inlet section 22, and blows the same out of the unit via air outlet section 24 and vent 28, as generally shown in FIGS. 1–2.

With blower 19 being mounted at the top, rather than at the bottom of housing 12, the incoming air is forced to flow inside refrigerant-packed container 14 against gravity G (FIG. 7), i.e. the air flow rate is purposely slowed down to allow for a longer air cooling period. A faster flow rate would contribute to a more rapid deterioration of encapsulated refrigerant 15. A relatively slower flow rate would prolong the "cold life" of each frozen glycol ball/bubble. Air is gradually cooled by flowing over the frozen glycol bubbles which collectively serve as a primary cooling source. Cold air is accumulated in air pockets formed between the compacted frozen glycol bubbles. This accumulated cold air serves as a secondary cooling source.

A person skilled in the art would readily appreciate that if there was no accumulation of frozen glycol bubbles, i.e. if container 14 were to be packed with a single contiguous refrigerant mass, cold air would only be produced from flowing around the exterior surface of the refrigerant mass. There would be no secondary source of cooling the air. Moreover, if ambient air were to be blown against (as opposed to being sucked in) such refrigerant mass, the ambient air would rapidly cause deterioration of the refrigerant surface. In such case, the overall cooling efficiency of the device may be degraded.

The provision of multiple refrigerant surfaces and air pockets there between, as contemplated by compactly packing encapsulated refrigerant 15 into thermally insulated container 14, ensures significantly improved cooling efficiency for air cooling device 10 when compared to known cooling devices. The cooled air flows through the entire refrigerant-packed container 14. The size of each frozen glycol ball, as well as the compactness of the balls may be varied, as needed. Obviously, if the ball size was too small, there would be insufficient cooling surface area. On the other hand, if the ball size was too big, the air pockets would grow in size which would have detrimental effect on the cooling of incoming air, i.e. the air flow rate would increase. In one example, the cross section of a frozen glycol ball is about 3.5 inches. Other suitable ball sizes may be utilized, as needed.

Figure 8:
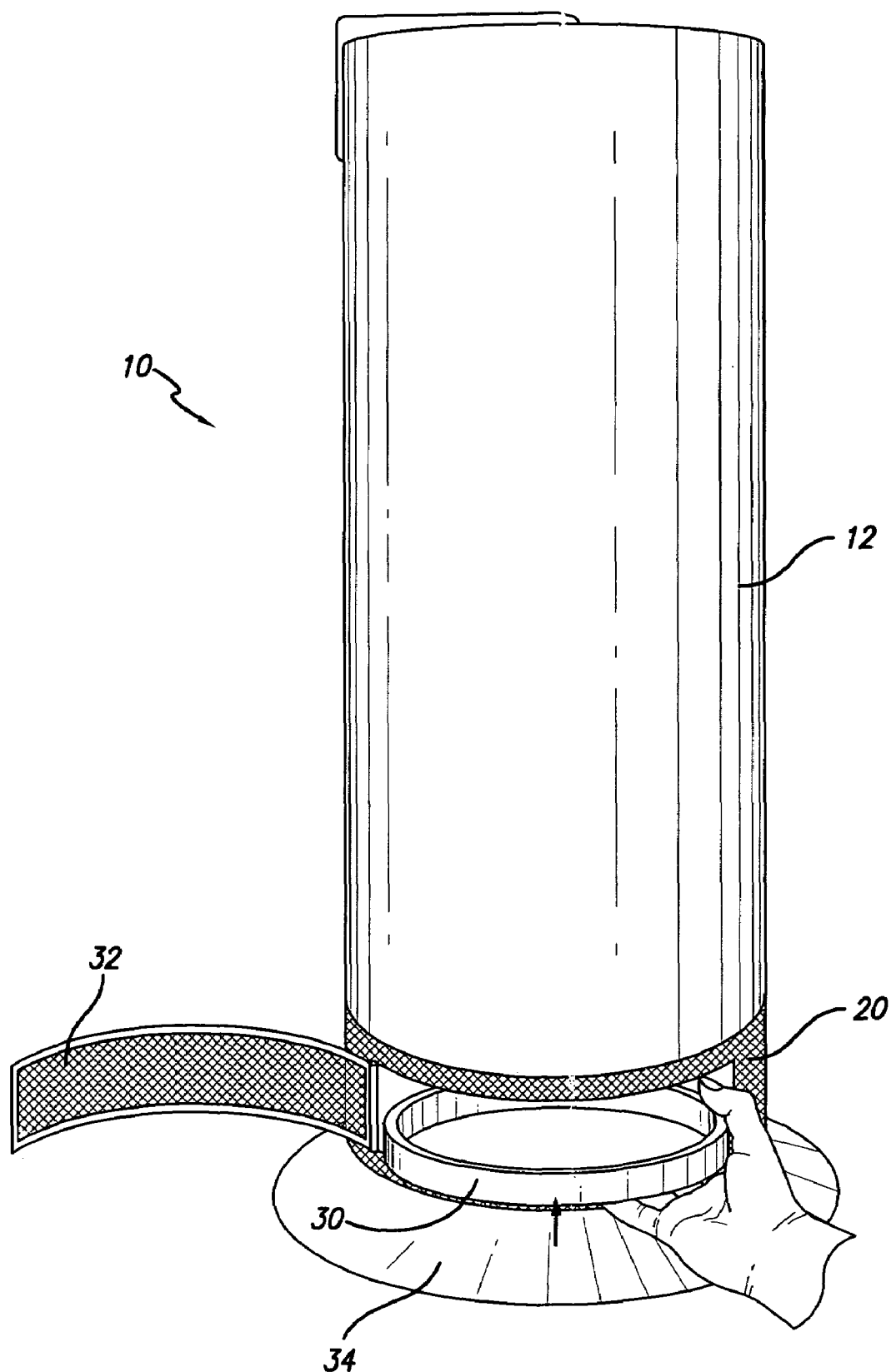
FIG. 8 is a rear perspective view of the air cooling device of FIG. 1.

Exposing warm ambient air to a cold environment leads to condensation. A condensation pan 30 (FIG. 8) is provided inside housing 12 under partially open bottom 18 of refrigerant packed container 14. Condensation pan 30 is adapted to capture water droplets formed during the air cooling process. Since blower 19 is mounted at the top of housing 12, there is no risk of water droplets falling on any electric/ electronic part. Also, with the evacuation effect produced from above by air inlet section 22 of blower 19, dispersion of formed water droplets within container 14 would be significantly inhibited. Condensation pan 30 is introduced into or removed from housing 12 via maintenance door 32, as generally depicted in FIG. 8. Maintenance door 32 may be formed as an integral part of mesh-like air intake portion 20. Maintenance door 32 may be adapted to pivot toward and away from the interior of housing 12. Housing 12 may be mounted at one end to a base 34 (FIG. 8).

The air cooling device of the present invention may be configured as a table top unit, a floor standing unit, or a hand-held unit. Other configurations are possible, provided such other configurations reside within the intended scope of the present invention. For example, housing 12 may be adapted to accommodate a plurality of thermally insulated containers, each packed with encapsulated refrigerant. The thermally insulated containers may be operatively coupled in series and/or in parallel. Moreover, each of the glycol-filled balls may be made with a relatively rough (textured) surface to inhibit fluidity, i.e. to further slow down the cooling period for the incoming air.

The air cooling device of the present invention is easy to maintain and/or store away, if not needed. Other materials may be used to construct the air cooling device of the present invention, provided such other materials do not deviate from the intended scope and spirit of the present invention. The air cooling device of the present invention has a relatively small footprint, while offering users an attractive and efficient cooling solution.

A person skilled in the art would appreciate that exemplary embodiments described hereinabove are merely illustrative of the general principles of the present invention. Other modifications or variations may be employed that are within the scope of the invention. Thus, by way of example, but not of limitation, alternative configurations may be utilized in accordance with the teachings herein. Accordingly, the drawings and description are illustrative and not meant to be a limitation thereof.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

What is claimed is:

1. An air cooling device, comprising:
   at least one thermally insulated container being packed with encapsulated refrigerant and adapted to pass incoming air for cooling, said at least one thermally insulated container having partially open top and bottom ends;
   a housing adapted to accommodate said at least one thermally insulated container and force the incoming air to flow inside said at least one refrigerant-packed container against gravity to ensure a prolonged air cooling period, said housing being equipped at one end with a blower and at an opposite end with an air intake portion, said blower including an air inlet section, an air outlet section and fan blades being driven by an integral motor, wherein said air inlet section of said blower is in communication with said partially open top end of said at least one thermally insulated container and adapted to evacuate cold air coming from the interior of said at least one refrigerant-packed container, said air outlet section being equipped with at least one vent; and a base, wherein said housing is mounted at the air intake portion end to said base and adapted to receive a condensation pan between said base and said partially open bottom end of said at least one thermally insulated container.

2. The air cooling device of claim 1, wherein said air inlet section is equipped with at least one filter.

3. The air cooling device of claim 1, wherein said encapsulated refrigerant is configured as a plurality of compacted frozen balls.

4. The air cooling device of claim 3, wherein each of said balls is filled with a cooling agent capable of freezing and sustaining its frozen state for periods longer than water once exposed to the atmosphere.

5. The air cooling device of claim 4, wherein said cooling agent is ethylene glycol.

6. The air cooling device of claim 4, wherein said cooling agent is an ethylene glycol polymer.

7. The air cooling device of claim 4, wherein said cooling agent is propylene glycol.

8. The air cooling device of claim 4, wherein said cooling agent is a propylene glycol polymer.

9. The air cooling device of claim 4, wherein said cooling agent is glycerol.

10. The air cooling device of claim 4, wherein said cooling agent is a glycerol polymer.

11. The air cooling device of claim 1, wherein said encapsulated refrigerant is configured as a plurality of compacted frozen glycol balls.

12. The air cooling device of claim 4, wherein said cooling agent is injected in each of said balls.

13. The air cooling device of claim 11, wherein said glycol balls are trapped between flexible sheets of plastic.

14. The air cooling device of claim 13, wherein said flexible plastic sheets are heat-sealed to securely and compactly trap said glycol balls between said sheets.

15. The air cooling device of claim 1, wherein said at least one thermally insulated container is made from plastic.

16. The air cooling device of claim 1, wherein said at least one thermally insulated container is made from foam.

17. The air cooling device of claim 14, wherein air pockets are formed between said compactly trapped glycol balls.

18. The air cooling device of claim 17, wherein cold air is being accumulated in said air pockets.

19. The air cooling device of claim 14, wherein said compactly trapped frozen glycol balls collectively serve as a primary source of cooling for the incoming air.

20. The air cooling device of claim 18, wherein said accumulated cold air serves as a secondary source of cooling for the incoming air.

* * * * *